C. M. MYERS.
ROCK PICKER, HARROW, AND POTATO DIGGER.
APPLICATION FILED AUG. 14, 1917.
1,318,901.
Patented Oct. 14, 1919.
2 SHEETS—SHEET 1.
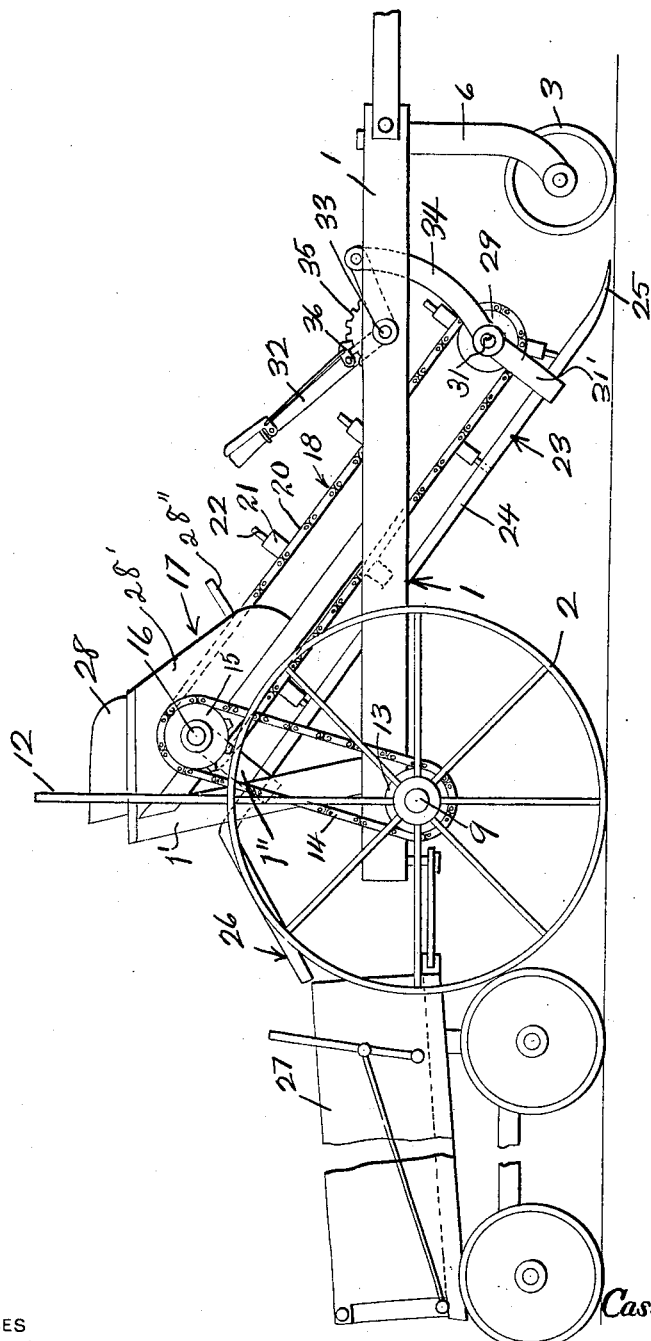
INVENTOR
Cassius M. Myers,
WITNESSES
BY
ATTORNEY C. M. MYERS.
ROCK PICKER, HARROW, AND POTATO DIGGER.
APPLICATION FILED AUG. 14, 1917.
1,318,901.
Patented Oct. 14, 1919.
2 SHEETS—SHEET 2.
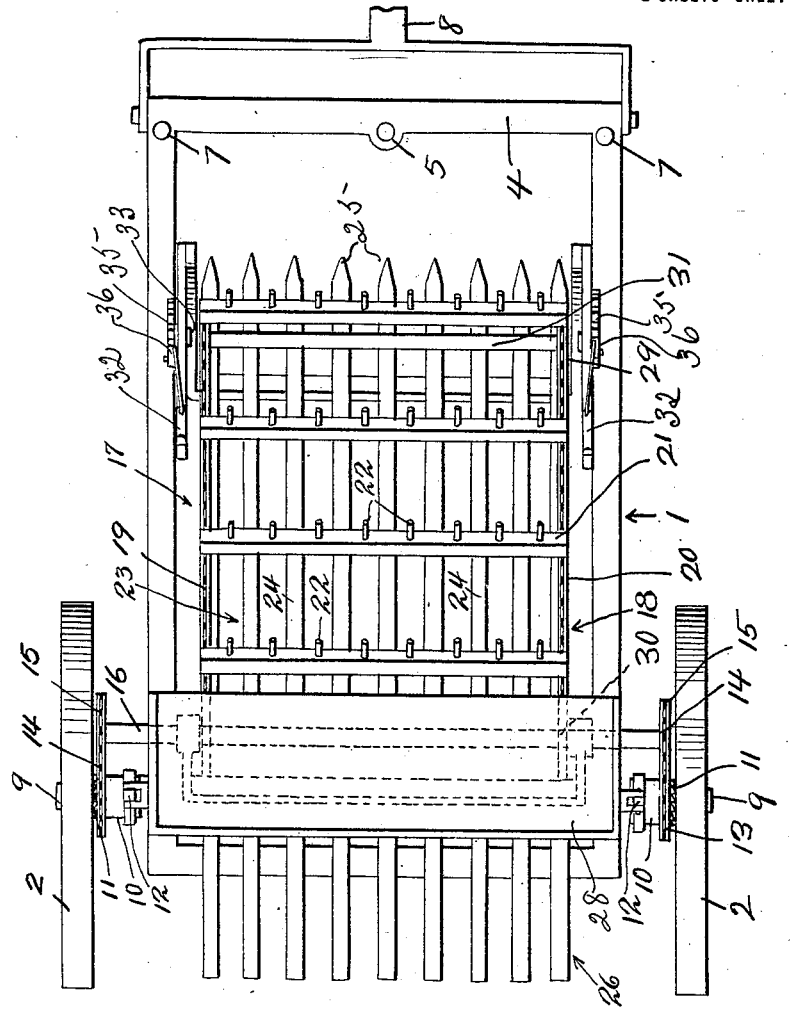
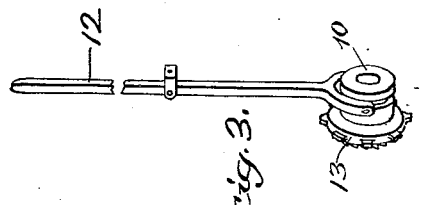
INVENTOR
Cassius M. Myers,
BY
ATTORNEY

UNITED STATES PATENT OFFICE.

CASSIUS M. MYERS, OF SPRINGFIELD, MISSOURI.

ROCK-PICKER, HARROW, AND POTATO-DIGGER.

1,318,901.  Specification of Letters Patent.  Patented Oct. 14, 1919.

Application filed August 14, 1917. Serial No. 186,171.

*To all whom it may concern:*

Be it known that I, CASSIUS M. MYERS, a citizen of the United States, residing at Springfield, in the county of Greene and State of Missouri, have invented certain new and useful Improvements in Rock-Pickers, Harrows, and Potato-Diggers, of which the following is a specification.

This invention relates to agricultural implements and more particularly to potato or stone gathering machines.

The object of the invention is to provide a machine of this character so constructed as to operate as a combined harrow and gatherer, being especially designed for gathering stones and potatoes, or both.

Another object is to provide an apparatus of this character which is simple in construction and which may be cheaply manufactured and easily operated and which, being formed of few parts, will not be readily broken.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of an apparatus constructed in accordance with this invention and with a trailer shown attached thereto for receiving the articles gathered by the machine.

Fig. 2 is a plan view thereof, and

Fig. 3 is a detail perspective view of one member of the clutch and its actuating lever.

In the embodiment illustrated a supporting frame 1 is shown which is preferably rectangular in form, being mounted at its rear end on traction wheels 2 and having a swiveled supporting wheel 3 detachably mounted in the front cross bar 4 thereof. This cross bar 4 is provided midway its ends with a bearing 5 which is designed to receive the standard 6 of wheel 3 when a single wheel is to be employed and is provided at its opposite end with bearings 7 which are used when two wheels 3 are used for supporting the front end of the frame and which is desirable when the machine is to be operated over level ground. A single wheel is preferable when the machine is used on hillsides or in places where tilting would be likely if two wheels were used at the front.

This machine may be drawn by any suitable means and is here shown provided at its front end with a tongue broken off for convenience in illustration and as it forms no part of the invention it will not be further shown or described.

The wheels 2 are fixed to the opposite ends of an axle 9 which extends transversely of the machine and on which are slidably mounted clutch members 10 which are designed to mesh with coöperating clutch members 11 carried by the inner ends of the wheel hubs. Levers 12 are engaged with the clutch members 10 and project upwardly into position convenient for actuation by the driver so that when it is desired to disconnect said clutch members, the member 10 may be readily shifted in the ordinary manner.

Sprocket wheels 13 are carried by the clutch members 10 and are designed to receive motion from the turning of the wheels 2 when the clutch members 10 and 11 are in mesh, it being understood that the members 10 normally turn loosely on the shaft or axle 9 so that when they are disconnected from the members 11 no motion will be imparted to the sprocket wheels 13. Sprocket chains 14 pass around the wheels 13 and over other sprocket wheels 15 fixed to a shaft 16 which is journaled in the upper end of arms 1″ carried by standards 1′. This shaft 16 also operates as a pivot for a carrier frame 17 and is designed to impart motion to a carrier or conveyer 18 which travels in said frame.

The carrier 18 as here shown is composed of two endless sprocket chains 19 and 20 connected by toothed cross bars 21 which are spaced apart suitable intervals with the teeth 22 thereof projecting outwardly and which are adapted to engage the articles gathered and move them upwardly over an inclined slatted bottom 23 which is mounted to swing vertically between standards 1′ carried by frame 1. The slats 24 from which this bottom is formed have their free front ends projected forwardly, pointed and curved slightly upward as shown at 25 to provide fingers or blades which are adapted for scooping up the articles to be gathered and which also may operate as harrows for pulverizing or breaking up the earth over which the machine is drawn. The rear ends of these slats 24 are deflected downwardly to form an inclined chute 26, which is designed to deliver the gathered articles into a suitable receptacle which is here shown in the form of a wagon 27 detachably connected with the rear end of the frame 1. Two of these wagons or trailers 27 are preferably supplied with each machine so that when one is being dumped the other may be connected with the machine and thus avoid the necessity of stopping the machine during the dumping of the wagon.

A seat 28 is mounted on this machine for the use of the driver and a hood 28' is preferably provided for covering up the conveyer 18 thereby preventing dust from rising and discommoding the operator.

The conveyer chains 19 and 20 pass over sprocket wheels 29 and 30 carried respectively by shafts 31 and 16, the former of which is disposed at the lower end of the inclined bottom 23 and the latter is mounted at the upper end thereof as is shown clearly in the drawings. It is to be understood that two of these sprocket wheels 29 and 30 are provided at each side of the machine to support and transmit motion to the chains 19 and 20 of the carrier. The shaft 31 is mounted in suitable standards 31' which project upwardly from the side slats 24 and bell crank levers 32 are fulcrumed on stub shafts carried by the side members of the frame 1. Each lever 32 is connected with a standard 31' by means of an arcuate link 34 so that when said lever 32 is actuated the slatted bottom 23 with the carrier 18 mounted thereon will be raised or lowered according to the direction in which said lever is turned it being obvious that when the lever is swung down toward the driver the bottom will be raised and when it is moved outwardly or upwardly the bottom will be correspondingly lowered. Segmental racks 35 are also carried by the side members of frame 1 in position to be engaged by locking dogs 36 carried by the levers 32 so that when said levers have been swung in the desired position they may be locked in such position by the engagement of the dogs with the racks in the ordinary manner.

In the use of this improved apparatus, the parts are in the position shown in Fig. 1, in which position the slatted bottom 23 carrying the digging blades 25 is lowered ready for passage over the ground containing the articles to be gathered. The machine is then drawn over the ground and the blades 25 operate to pulverize the surface as well as to scoop up the articles contained thereon which latter are conveyed up the inclined slatted bottom 23 by means of the toothed conveyer 18 and pass over the upper end of said bottom, downwardly over the chute 26 into the wagon 27 disposed at the rear of the machine ready to receive them. It is to be understood that the passage of the articles over the slatted bottom 23 will operate to shake off any earth which may cling thereto and it will be sifted therethrough on to the ground below, the articles passing in cleaned condition into the receptacle designed to receive them and which is here shown in the form of a trainer or wagon 27.

When it is desired to convey the apparatus from field to field, the levers 12 are actuated to disengage the clutch members 10 from the members 11 so that no motion will be imparted by the rotation of the wheels 2 and the levers 32 being swung downwardly and rearwardly will operate to raise the front end of the slatted bottom 23 which carries the conveyer 18 thereby positioning the blades 25 out of contact with the surface over which the machine is drawn.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:

In a machine of the class described, a substantially rectangular frame mounted on wheels, standards rising from the rear end of said frame, arms extending obliquely forward from said standards, a shaft journaled in said arms, driving mechanism connecting said shaft and wheels, a carrier frame pivotally mounted on said shaft, a carrier mounted to travel in said frame and to receive motion from said shaft, an inclined slatted bottom mounted to swing vertically on said standards and arranged under said carrier supporting the lower end thereof, the slats of said bottom being extended forwardly and shaped to form gatherers, and a lever and link connection between said slatted bottom and said rectangular frame to provide for the raising and lowering of said bottom and carrier.

In testimony whereof I affix my signature in presence of two witnesses.

CASSIUS M. MYERS.

Witnesses:
EMILY JANE HUBBLE,
O. E. ROBB.